UNITED STATES PATENT OFFICE.

TIMOTHY EARLE, ASSIGNEE OF H. HALVORSON, OF LEICESTER, MASS.

IMPROVEMENT IN PREPARING AND HARDENING RAW HIDES.

Specification forming part of Letters Patent No. 5,301, dated September 25, 1847.

*To all whom it may concern:*

Be it known that I, HALVOR HALVORSON, of Leicester, in the State of Massachusetts, have invented or discovered a new and useful process by which hides or skins of animals may be thickened and hardened or manufactured into a semi-transparent substance resembling horn, which may be used for many useful purposes in the arts; and I do hereby declare that the nature of my said discovery is fully described in the following specification.

I commence my process by taking the raw hide and submitting it to what the tanners usually term "sweating" or putrefaction sufficient to remove the hair, or instead thereof I immerse the hide in a solution of lime or alkali proper to remove the hair. I next place it in and submit it to the action of a boiling or hot bath of any powerful astringent and alkaline or other suitable substance sufficient to remove the animal oil or fatty matter, and to full or mill it up or make it thicker. So far as my experience goes, I find sulphuric acid, salts of tartar, and alum dissolved in water to answer a good purpose. I keep the hide in the solution in a state of ebullition, and frequently agitate or stir the liquid, and bend and unbend or compress and open, or handle or work the hide by tongs, while it is under the influence of the bath, or I remove it from the hot bath, and having smeared my hands with oil or grease in order to protect them from injury from the caustic or other properties of the solution, I lay hold of the hide and squeeze and work it in various ways in order to cause the liquid to penetrate it and properly act upon it so as to full or thicken it and remove the animal fat or oleaginous matter; or, instead of the above mode of proceeding, I make use of any suitable mechanical means by which the operation of the alkaline and astringent liquid may be facilitated, whether to remove the animal oil or to full or thicken the hide. After thus having fulled it to the desired thickness or completed the process of removing the extraneous animal oil, I rinse it in warm and clear water and dry it. At this stage of the process the hide retains its opacity and will be found to be very easily affected by atmospheric changes. In damp weather it will absorb moisture and become more or less soft. In cold or dry weather it will resume its hardness. Consequently while in this state it is unfit for many purposes. In order to render it semi-transparent and capable of resisting the influence of ordinary atmospheric changes, or that of a considerable degree of heat, I next immerse it in a caldron of boiling or hot linseed or drying oil, or any other suitable vegetable or other oil possessing drying qualities, and keep it therein (while the oil is boiling) until a white or yellowish scale or crisp begins to form on its surface. As soon as this is discoverable the hide should be removed from the oil. While hot it will be found soft and pliable and capable of being made, pressed, or molded into various shapes. When cold it will be found to have been changed or converted into a substance resembling in many respects horn or tortoise-shell, and may be bored, turned, or filed or otherwise wrought like them or ivory.

I would here remark that should the hide thus prepared be designed for embossed work—such as figured buttons, combs, or other articles of such nature—it is advisable to remove it from the boiling oil as soon as it acquires the desired transparency and softness, and before the white scale hereinbefore alluded to makes its appearance. After being thus prepared it may be submitted to pressure in the mold. During the last portion of the process—viz., the boiling in oil—the material may be stained by incorporating with the oil any dyeing material or materials that will be proper to produce any desired color. It may be colored also in a manner to resemble tortoise-shell by such modes as are usually adopted to give to horn such an appearance. The oil in ebullition communicates a greater heat to the material than the astringent alkaline liquid does, in consequence of which it becomes indurated when cold and susceptible of a high polish. The drying-oil penetrates the pores of the hide and takes the place of the animal oil previously extracted, and by so doing not only renders the skin hard like horn, but guards it from the effects of ordinary atmospheric changes, whether of temperature or moisture.

Where it may not be required to full up or thicken a hide to its greatest extent of capacity the use of an astringent solution may be dispensed with, it being only necessary in such case to employ the alkaline solution or some equivalent capable of removing the animal oil and extraneous matters, and afterward expose the skin or hide to the action of hot or boiling oil, all in the manner above set forth.

What I claim as my invention or discovery is—

The hereinbefore-described process of treating the skin or hide of animals or of thickening and converting it into a substance resembling horn, the same consisting in steeping or boiling it in an alkaline solution, an astringent solution, or an alkaline and astringent solution, and afterward submitting it to the action of hot or boiling oil, substantially as specified; and, furthermore, as it may often not be desirable to full up or thicken the hide or skin, but simply to render it hard and semi-transparent, I claim to accomplish the same by steeping or boiling it in an alkaline solution and afterward in a hot or boiling drying-oil, as described.

In testimony whereof I have hereto set my signature this 9th day of January, A. D. 1847.

HALVOR HALVORSON.

Witnesses:
 WM. GREENLEAF,
 CYRUS BAKER.